United States Patent [19]

Browning

[11] Patent Number: 4,960,458

[45] Date of Patent: Oct. 2, 1990

[54] WIRE FEED SYSTEM FOR FLAME SPRAY APPARATUS HAVING INCREASED WIRE

[76] Inventor: James A. Browning, P.O. Box A, Enfield, N.H. 03748

[21] Appl. No.: 446,359

[22] Filed: Dec. 5, 1989

[51] Int. Cl.[5] .................. B01J 2/02

[52] U.S. Cl. .................. 427/423

[58] Field of Search .................. 75/0.5 B, 0.5 BA

[56] References Cited

U.S. PATENT DOCUMENTS 4,474,604 10/1984 Nakamura .................. 75/0.5 B

*Primary Examiner*—Peter D. Rosenberg

*Attorney, Agent, or Firm*—Sughrue, Mion, Zinn, Macpeak & Seas

[57] ABSTRACT

In a combustion of plasma flame spray apparatus a tightly-packed array of individual wires or rods is fed into and through the plasma flame to heat, atomize and project against a surface to build up a coating thereon. The individual wires may be arranged as parallel strands or twisted together to form a cable. The wires are of circular diameters, and the twisted array of wires may be held together by a cement which is consumed when passing through the flame region. The cement may constitute a pyrophoric mixture such as a sheath surrounding the array of wires and consist of a stoichiometric mixture of two reactive metals including nickel and aluminum which react to form a nickel-aluminide.

8 Claims, 1 Drawing Sheet

WIRE FEED SYSTEM FOR FLAME SPRAY APPARATUS HAVING INCREASED WIRE

This invention relates to an improved plasma arc or combustion flame spray method, and more particularly to a flame spray method which increases the wire flame spray rate in the flame spray process.

BACKGROUND OF THE INVENTION

In such flame spray process, a wire is passed through a combustion or plasma flame which has relatively high gas velocity characteristics. The wire is melted to form droplets, and the droplets are accelerated by the flame gases exiting a nozzle bore at very high velocity to strike a substrate downstream of and facing the nozzle, whereby the accelerated droplets in striking the surface of the substrate build up a coating thereon. Wire materials are commonly metals such as zinc, aluminum, copper. steel, nickel, stainless steel, and the like.

To date it has been the practice to use single round cylindrical wires. These are readily available and easily fed into the spraying device by a powered roll system feeder. Some systems have been designed to use two or more separate wires fed at different points into a single flame, and although there is an increase in spray rate, a more complex feed system is required.

There is a major disadvantage using single round cross-sectional wires. For a cylindrical structure of this type, a circular cross-section presents the minimum surface area for the flame heat to pass into the metal to effect the necessary heating. Other than round wires may be used such as star shaped, rectangular, etc., but they are more expensive to fabricate and their irregular surface makes them difficult to feed reliably. Patents exemplary of feeding wire in a flame spray system are as follows:

| U.S. Pat. No. | Issue Date | Inventor | Title |
|---|---|---|---|
| 4,248,513 | Apr. 26, 1966 | Sunnen | EQUIPMENT FOR FORMING HIGH TEMPERATURE PLASMAS |
| 3,312,566 | Apr. 4, 1967 | Winzeler et al. | ROD-FEED TORCH APPARATUS AND METHOD |
| 4,095,081 | June 13, 1978 | Ashman | ELECTRIC ARC METAL SPRAY-ING DEVICES |
| 4,147,917 | Apr. 3, 1979 | Jelmorini | METHOD AND DEVICE FOR PLASMA-MIG-WELDING |
| 4,370,538 | Jan. 25, 1983 | Browning | METHOD AND APPARATUS FOR ULTRA HIGH VELOC-ITY DUAL STREAM METAL FLAME SPRAYING |
| 4,762,977 ARC | Aug. 9, 1988 | Browning | DOUBLE ARC PREVENTION FOR A TRANSFERRED-FLAME SPRAY SYSTEM |
| 4,788,402 | Nov. 29, 1988 | Browning | HIGH POWER EXTENDED ART PLASMA SPRAY METHOD AND APPARATUS |

In U.S. Pat. No. 4,788,402, the embodiment of FIG. 5, two separate material feeds are provided for the flame spray in rod form, fed into the extended arc column at the exit end of nozzle 34. This results in the further increased melt off rate. Plasma spray torches feeding multiple wires into the gas stream initiating the arc therebetween and melting particles from both wires are evidenced by U.S. Pat. No. 4,370,538 at FIG. 6 and U.S. Pat. No. 4,762,977 at FIG. 4. Winzeler et al. U.S. Pat. No. 3,312,566 uses three rods resulting in an increased deposition rate, an increased degree of uniformity and asymmetry in plasma containing the multiple particles. Ashman U.S. Pat. No. 4,095,081 shows two rods fed diametrically opposite to a center plane. Jelmorini U.S. Pat. No. 4,147,917 discloses a simultaneous feeding of two wires where two respective MIG-arcs are struck and maintained between the two welding wires axially introduced into the gas stream and the workpiece W. Such patents exemplify the prior art as known tc the applicant.

It is therefore an object of the present invention to provide an improved flame spray process in which a simplified but highly effective wire feed is achieved using wires of round cross-section with highly increased wire spray rate.

DESCRIPTION OF PREFERRED EMBODIMENTS

Figure 1:
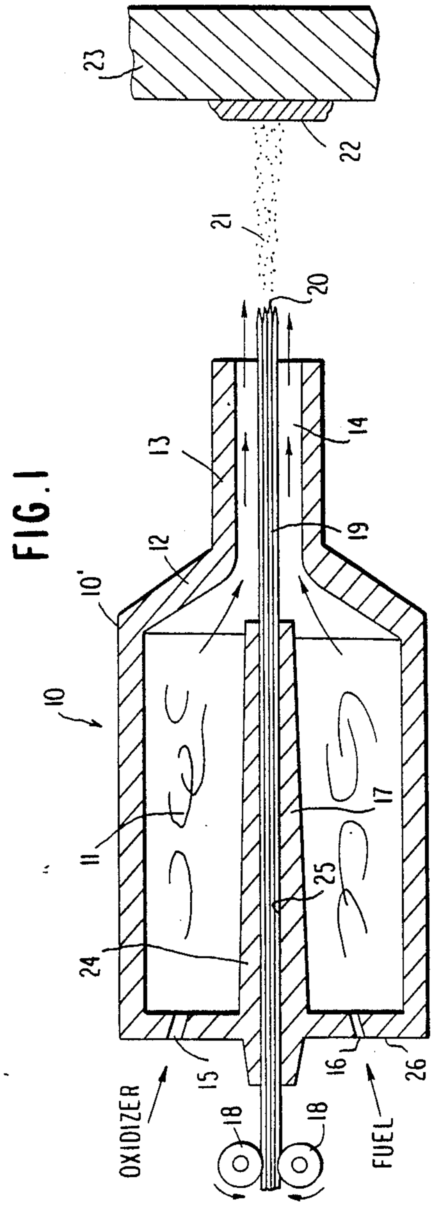
FIG. 1 is a longitudinal sectional view of a combustion spray torch employed in spray coating of a substrate using the improved wire feed system forming a preferred embodiment of the present invention.

Applicant's invention relies on the use of multiple, relatively small diameter wires bundled together to form a tight array for ease of feeding to the torch. The wires form a multiple wire array, for instance in FIGS. 1 and 2, seven small-diameter wires form a single, parallel wire array. In the process of the invention, a flame spray burner indicated generally at 10 comprises an outer cylindrical wall 10 acting in conjunction with a axial inner annular wall 17 formed by an axially projecting wire guide 24 from an integral end wall 26. Wire guide 24 has an axial bore 25 through which is fed a multiple array 19 of small diameter wires 27. The inner and outer walls 17, 10' form annular chamber 11. An oxidizer (air and/or oxygen) passes through hole 15 within end wall 26 to burn in chamber 11 with fuel (liquid or gas) passing through inlet hole 16 within end wall 26. The downstream portion of the flame spray combustion type burner 10 necks down at 12 to form a nozzle section 13 containing a relatively small diameter nozzle passage or bore 14. The axial wire guide 24 terminates near the entrance to the nozzle passage or bore 14. The array 19 of parallel straight small-diameter wires 27 is fed by wire feed rolls 18 driven oppositely as indicated by the arrows through the axial bore 25 of the wire guide 24. Upon ignition of the fuel and air mixture within the combustion chamber 11, combustion gases which, under critical flow conditions, reach sonic velocity, exit from the chamber 11 and are accelerated in passing through the nozzle 14. Rapid heating of the wire array 19 results with melting of the wire material to form droplets 21 which normally occurs in the vicinity of the nozzle passage 14 exit. The exit gases, which can be supersonic, accelerate the droplets 21 to extreme velocity to impact against workpiece 23 acting as a substrate to form costing 22. Burner 10 is usually provided with water cooling, but the drawing has been simplified, at the same time eliminating the ignition means for igniting the fuel/air mixture within the combustion chamber 11.

Figure 2:
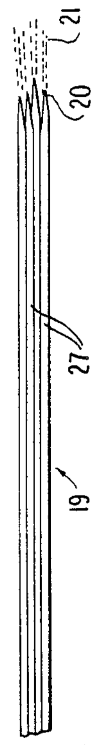
FIG. 2 is an enlarged plan view of a multi-wire array consisting of multiple parallel strands for heating and spraying in the apparatus of FIG. 1.
Figure 2A:
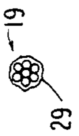
FIG. 2a is an end view of the multi-wire array of FIG. 2.

The enlarged showing of FIGS. 2 and 2*a* is of a packed array of seven small-diameter wires 27 of circular cross-section forming the array 19 of parallel, axial geometry. Preferably, to hold these separate wires 27 together, a cementing agent is used. The cementing agent should be of the type that is completely consumed in the passage through nozzle bore 14. A convenient variant is to form this cement (glue) of a combustible material which, under some cases, can be made to burn at temperatures substantially that of the products of combustion or even higher. For example, a stoichiometric mixture of nickel and aluminum particles held together by a binder may be used.

The pyrophoric substance constituting a stoichiometric mixture may be of two reactive metals including nickel and aluminum which react to form nickel-aluminide. The pyrophoric substance may take the form of a sheath 29, FIG. 2*a*, which surrounds said array of wires 27.

A convenient substitute for the multiple wire array 19 composed of parallel straight wires 27 is to use a twisted wire cable 31. For example, a common cable size and structure uses seven 1/16-inch diameter wires 28 twisted to form a single multi-strand wire array. An advantage of the twisted cable 31 is that, when rapidly heated, the individual wires 28 spread outwardly as at 32 into the heating stream of gas exposing each wire 28 as though it were passed singly through the flame.

Figure 3:
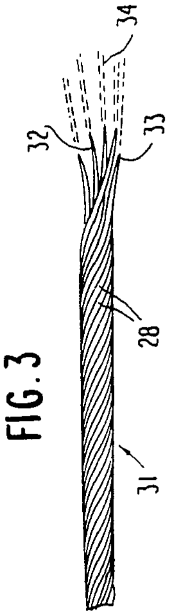
FIG. 3 is a plan view of an alternate multi-wire array of helically wound multiple strands in the form of a wire rope for use in the process of the present invention.
Figure 3A:
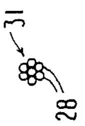
FIG. 3a is an end view of the multi-wire array of FIG. 3.

Under the process of the present invention, there is produced a spray of particles 21 of decreased average particle diameter to help create coatings 22 of increased density on substrate 23. It is a fact that particles atomized from a small-diameter wire such as wires 27, 28 are smaller than those created from a large-diameter wire typically of the prior art. As such, wire rope of many more strands than shown in FIG. 3 will produce a much finer droplet spray dispersion. FIG. 3*a* is a end view of the wire cable 31 showing the seven individual strands 28.

Although the invention has been described in conjunction with a apparatus constituting a "rocket" type combustor the principles apply to other types of heating means, including plasma flame devices.

While the invention has been shown and described in detail with reference to preferred embodiments thereof, it would be understood by those skilled in the art to which this invention pertains, that various changes in form and detail may be made therein without departing from the spirit and scope of the invention.

What is claimed is:

1. In a flame spray process including feeding material to be flame sprayed in and through a flame to heat, atomize and project the material against a surface to build up a coating of material on said surface, the improvement wherein said step of feeding material in and through flame comprises feeding said material in the form of a tightly-packed array of wires of circular cross-section whereby the heat transfer area-to-mass ratio of said material and the flame spray rate is significantly increased with droplet particle diameters significantly smaller than those produced under the same conditions from a single wire of circular cross-section of the same outer diameter as that of the array.

2. The method as claimed in claim 1, wherein said step of feeding a tightly-packed array of wires comprises feeding at least two individual wires arranged in side-by-side parallel peripheral contacting strands.

3. The method as claimed in claim 1, wherein said step of feeding a tightly-packed array of wires comprises feeding a cable of at least two individual wires together.

4. The method as claimed in claim 1, wherein said step of feeding a tightly-packed array of wires comprises feeding said wires in an array with strands formed thereby held together by a cement and said process further involves consuming the cement during passage into and through the flame with high heat transfer being effected from the combustion gases to the tightly-packed array of wires.

5. The method as claimed in claim 1, wherein a pyrophoric mixture is fed as a constituent part of the array of wires into said flame to increase the heat transfer rate from the combustion gases creating the flame to said array.

6. The method as claimed in claim 5, wherein said pyrophoric mixture constitutes a cementing agent cementing said at least two individual wires of said tightly-packed array.

7. The method as claimed in claim 5, wherein said pyrophoric mixture is fed into the flame as a sheath surrounding said array of wires.

8. The method as claimed in claim 5, wherein said pyrophoric mixture is a stoichiometric mixture of two reactive metals including nickel and aluminum which react to form nickel-aluminide.

* * * * *